United States Patent Office 3,465,037
Patented Sept. 2, 1969

3,465,037
PRODUCTION OF MESO 2,3-DIBROMO-SUCCINIC ACID
Herbert Jenkner, Cologne-Deutz, Germany, assignor to Chemische Fabrik Kalk, G.m.b.H., Cologne - Kalk, Germany
No Drawing. Filed Feb. 16, 1966, Ser. No. 527,740
Claims priority, application Germany, Feb. 23, 1965, C 35,154
Int. Cl. C07c 55/10; A01n 9/24; C09k 3/28
U.S. Cl. 260—537     3 Claims

ABSTRACT OF THE DISCLOSURE

Meso 2,3-dibromosuccinic acid is produced by introducing bromine into a suspension of fumaric acid or maleic acid in an aqueous solution containing 10 to 48 wt. percent of dissolved HBr while maintaining a temperature between about 50 and 90° C.

---

This invention concerns a method of producing the meso-form of 2,3-dibromosuccinic acid.

It is known that 2,3-dibromosuccinic acid can be obtained by the addition of bromine to fumaric or maleic acid, it being possible to form two stereoisomeric forms of which one occurs in two optically active antipodes. While the bromination of fumaric acid gives rise to the optically inactive meso-form of 2,3-dibromosuccinic acid which melts, with decomposition, at a temperature of 260° C., the bromination of maleic acid results in the racemate of the optically active forms of 2,3-dibromosuccinic acid which melts at a temperature of 167° C.

However, it was not hitherto possible to obtain good yields of 2,3-dibromosuccinic acid on a large industrial scale by bromination of fumaric or maleic acid.

Even though bromination of fumaric acid may be carried out in an aqueous medium at a high temperature in small quantities (about 0.2 kg.), producing yields of up to 80% theory, attempts to transfer this modus operandi to industry have shown that yields of only up to 50% theory can be attained. In the case of these large industrial mixtures, numerous undesirable side-reactions occur which result in products from which dibromosuccinic acid can be separated only by expensive processes.

If maleic acid, instead of fumaric acid, is subjected to bromination in an aqueous solution, then a mixture of several compounds is likewise produced.

The direct addition of bromine to maleic acid results in the racemate of the optically active 2,3-dibromosuccinic acid. At the same time however, a transposition of the maleic acid to fumaric acid takes place from which the meso-form of 2,3-dibromosuccinic acid is formed. The manufacture of the meso-form of 2,3-dibromosuccinic acid on an industrial scale is not possible in this way, either, because the aforesaid transposition occurs to the extent of not more than 25 to 30% and the meso-form of 2,3-dibromosuccinic acid is only with difficulty isolated from the mixture of resultant products.

Attempts were therefore made to find a way of obtaining the meso-form of 2,3-dibromosuccinic acid on an industrial scale with a satisfactory yield of pure material.

A method was found of producing the meso-form of 2,3-dibromosuccinic acid by the reaction of fumaric or maleic acid or a mixture thereof with bromine in a molar ratio of 1:1 to 1:1.1 at temperatures of 50 to 90° C. in an aqueous medium. According to this method, the bromine is introduced into a suspension of fumaric or maleic acid or a mixture thereof in an aqueous solution containing 10 to 48% by weight and preferably 20 to 35% by weight dissolved hydrogen bromide.

In the method of the invention, which can be performed continuously or discontinuously, the fumaric or maleic acid or a mixture thereof is preferably first suspended in the aqueous solution of hydrogen bromide while this latter is being intensely agitated. It is an advantage if the suspension contains, for every part-by-weight fumaric or maleic acid or a mixture thereof, 2 to 3 parts-by-weight of the aqueous hydrogen bromide solution. Before commencing to add the bromine, the aqueous hydrogen bromide solution or suspension is heated to a temperature of 50 to 90° C. While the mixture is being stirred vigorously, the bromine is then slowly introduced into the suspension until the reaction mixture contains 1 to 1.1 mole bromine per mole of fumaric or maleic acid. While the bromine is being added, the temperature of the mixture should be kept at 60 to 90° C. The higher the concentration of hydrogen bromide in the hydrogen bromide solution used as the reaction medium, the higher the temperature of the reaction mixture should be within the framework of the range of temperatures indicated. Since bromination of the fumaric or maleic acid is an exothermic reaction, it will in most cases be necessary to cool the reaction mixture during the addition of the bromine. When all the bromine has been added, the reaction mixture should be stirred at the same temperature for some time, about 15 minutes to 2 hours. Should the reaction mixture subsequently still exhibit a yellow colouring due to a slight content of free bromine, this colouring can be removed by adding small quantities of water. The reaction mixture is then cooled, preferably to temperatures of 10° C. or less. The 2,3-dibromosuccinic acid which crystallises as a result is separated from the mother liquor. Any hydrogen bromide which may still be clinging to the 2,3-dibromosuccinic acid can easily be removed by washing, advantageously with water. The yield of dry 2,3-dibromosuccinic acid in meso-form, which is of adequate purity for most industrial applications, is 90 to 98% of the theoretical value.

All or part of the residual mother liquor, possibly after the addition of hydrogen bromide, can be used again in the process. Since maleic acid becomes entirely converted to fumaric acid in the presence of hydrobromic acid, it is possible according to the method of the invention, to produce the industrially important meso-form of 2,3-dibromosuccinic acid in high and hitherto unattainable yields not only from fumaric acid but also from maleic acid or from a mixture thereof with fumaric acid on an industrial scale.

The 2,3-dibromosuccinic acid which has been manufactured according to the invention has been found to have a degree of purity which is entirely adequate for most industrial applications, such as for example as a component in organic synthesis, as a flame-proofing medium or as a biocidal, particularly nematocidal or fungicidal, medium.

Example 1

6,000 parts-by-weight fumaric acid are stirred into suspension in 15,800 parts-by-weight 20% aqueous hydrobromic acid solution and the mixture brought to a temperature of 54° C. While this suspension is being stirred, 8,400 parts-by-weight bromine are slowly stirred into this suspension. The reaction mixture is maintained, by cooling, at a temperature of 75 to 80° C. When the addition of bromine is completed, the mixture is stirred for about 1 hour at a temperature of 70° C. and then cooled to 10° C. The 2,3-dibromosuccinic acid filtered from the mother liquor is washed with water until no further hydrogen bromide can be traced in the washing water.

After drying, 13,940 parts-by-weight or 97.6% of the theoretical amount of 2,3-dibromosuccinic acid remain, in meso-form, which melts at 268° C., with decomposition, and the bromine content of which is 57.3% by weight. The mother liquor remaining is used for the next batch.

Example 2

11,600 parts-by-weight maleic acid are stirred into suspension into 25,000 parts-by-weight 48% hydrobromic acid at a temperature of 90° C. 16,800 parts-by-weight bromine are slowly stirred into this suspension. The reaction mixture is maintained by cooling at a temperature of 80° C. When the addition of bromine is completed, the mixture is stirred for about 1 hour at a temperature of 70° C. and then cooled to 10° C. The 2,3-dibromosuccinic acid filtered from the mother liquor is washed with water until no more hydrogen bromide can be traced in the washing water.

After drying, 25,050 parts-by-weight or 90.05% of the theoretical amount of 2,3-dibromosuccinic acid in meso-form remain, melting at 262° C., with decomposition, and the bromine content of which is 57% by weight.

The mother liquor remaining is used for the next batch.

Example 3

5,800 parts-by-weight fumaric acid and 5,800 parts-by-weight maleic acid are suspended in 25,000 parts-by-weight 48% hydrobromic acid and brominated, as set forth in Example 2, to form 2,3-dibromosuccinic acid.

After drying, 25,400 parts-by-weight or 92% of the theoretical amount of 2,3-dibromosuccinic acid in meso-form remain, melting at 263° C., with decomposition, and the bromine content of which is 57.5% by weight.

I claim:
1. A method of producing the meso-form of 2,3-dibromosuccinic acid which comprises introducing bromine into a suspension of an acid selected from the group consisting of fumaric acid, maleic acid and mixtures thereof in a hot aqueous hydrogen bromide solution containing 10 to 48% by weight HBr while maintaining a temperature between about 50° and 90° C. in said solution, the bromine being introduced into the reaction mixture to provide therein from 1 to 1.1 mole bromine per mole of the acid.
2. A method according to claim 1 wherein the hydrogen bromide solution contains essentially 20 to 35% by weight HBr dissolved in water.
3. A method according to claim 1 wherein the suspension contains 2 to 3 parts by weight of the aqueous hydrogen bromide solution for every part by weight of the acid and wherein the reaction temperature is maintained between 60° and 90° C.

References Cited

Chem. Absts., 6:2072 (1912).
Chem. Absts., 22:3629 (1928).
Nozaki et al., J.A.C.S., vol. 64, pp. 697–704, March 1942.

LORRAINE A. WEINBERGER, Primary Examiner

V. GARNER, Assistant Examiner

U.S. Cl. X.R.
252—8.1; 260—999